United States Patent

Subramanian et al.

[11] Patent Number: 5,185,305
[45] Date of Patent: Feb. 9, 1993

[54] CATALYST SYSTEM FOR TREATING THE EXHAUST FROM A LEAN-BURN GASOLINE-FUELED ENGINE

[75] Inventors: Somasundaram Subramanian, Melvindale; Mohinder S. Chattha, Northville, both of Mich.

[73] Assignee: Ford Motor Company, Dearborn, Mich.

[21] Appl. No.: 789,706

[22] Filed: Nov. 8, 1991

[51] Int. Cl.$^5$ ............................................ B01J 29/30
[52] U.S. Cl. ................................... 502/65; 423/213.5
[58] Field of Search ...................... 502/66, 65, 74, 71, 502/303; 423/213.5, 245.3, 247

[56] References Cited

U.S. PATENT DOCUMENTS

| | | | |
|---|---|---|---|
| 4,331,644 | 5/1982 | Ritscher | 423/213.2 |
| 4,791,091 | 12/1988 | Bricker et al. | 502/303 |
| 4,934,142 | 12/1988 | Hayashi | 60/297 |
| 5,021,389 | 6/1991 | Chatta et al. | 502/303 |
| 5,051,244 | 9/1991 | Dunne et al. | 423/213.5 |
| 5,063,192 | 11/1991 | Murakami et al. | 502/303 |

FOREIGN PATENT DOCUMENTS 2233145  9/1990  Japan ...................................... 502/74

OTHER PUBLICATIONS

"Automobile Catalytic Converters", Taylor, Springer, Berlin 1984, p. 107.
"Cu-ZSM-5 Zeolite as Highly Active Catalyst for Removal of Nitrogen Monoxide from Emission of Diesel Engines", Sato et al., Applied Catalysis, vol. 70, L1-15, 1991.

*Primary Examiner*—Carl F. Dees
*Attorney, Agent, or Firm*—Joseph W. Malleck; Roger L. May

[57] ABSTRACT

A catalyst system for converting $NO_x$, CO, and HC contained in the exhaust gas from a gasoline-fueled engine controlled to operate under lean-burn conditions (R=0.03–0.9) such that the a ratio of $NO_x$ to HC in the exhaust gas in in the range of $\frac{1}{3}$ to 3/1 (i.e., minimum $C_3H_6$ of 250 ppm and $NO_x$ of 200–400 ppm). The system comprises a first stage catalyst containing a transition metal-exchanged zeolite (i.e., Cu-ZSM5), and a three-way catalyst for treating the effluent from said first stage catalyst. The second stage catalyst consists of a high surface area alumina support impregnated with an intimate mixture of 0.5–20% lanthana, 0.2–30% palladium, and advantageously an outer washcoat $TiO_2$.

A method of treating the exhaust gas from a fossil-fueled engine comprising operating the engine under lean-burn conditions while controlling the emission ratio of $NO_x$/hydrocarbon to be in the range of $\frac{1}{3}$ to 3/1; exposing the exhaust gas to a first stage catalyst comprising a copper ion-exchanged ZSM5 zeolite having at least 3% by weight copper; and exposing the effluent from said first stage catalyst to a second stage catalyst comprising an alumina support impregnated with an intimate mixture of 0.5–20% lanthana and 2–30% palladium.

9 Claims, 4 Drawing Sheets

"CATALYST SYSTEM FOR TREATING THE EXHAUST FROM A LEAN-BURN GASOLINE-FUELED ENGINE"

BACKGROUND OF THE INVENTION

1. Technical Field

This invention relates to the technology of cleansing the exhaust from a gasoline-fueled automotive engine, and more particularly to catalysis technology that is operative with exhaust gases from a lean-burn internal combustion engine (excess oxygen providing a redox ratio of 0.03-0.9).

2. Discussion of the Prior Art

Emissions from mobile sources, such as automobiles, that contain $NO_x$ but little excess oxygen are removed by reaction with in situ reductants such as carbon monoxide or hydrocarbons (HC) when passed over catalysts, often containing rhodium. Such catalysts would be ineffective in the presence of a large excess of $O_2$ (see K.C. Taylor, "Automobile Catalyst Converters", Springer, Berlin, 1984). Recently, copper-exchanged zeolites have been found to reduce $NO_x$ in the presence of excess oxygen (see U.S. Pat. No. 4,934,142 and Japanese patent application publication Hei 3-52644, 3/6/91). Use of such a copper-exchanged zeolite catalyst with a gasoline-fueled engine operated under lean-burn combustion, results in relatively low $NO_x$ conversion, such as 25-35%, and relatively low HC conversion at or substantially below 60%. To increase the conversion of $NO_x$ and HC in the presence of excess oxygen from a gasoline-fueled vehicle, the prior art has conceived injecting hydrocarbons into the emissions ahead of the zeolite. This increases the hydrocarbon content in the exhaust (see Sato et al, Applied Catalysis, Volume 70, L 1-5, 1991). However, it is difficult to meter small doses of such gaseous reductants to accurately match the varying $NO_x$ content of the exhaust gas and to reliably and safely store such gaseous reductants on-board a vehicle. Moreover, injection of additional hydrocarbons does little to improve the overall hydrocarbon/CO conversion efficiency.

It is therefore an object of this invention to provide a catalyst system that operates on the exhaust of a gasoline-fueled lean-burn controlled engine. Under lean conditions, the HC, CO, and $NO_x$ conversions of the invented catalyst exceed the HC, CO, and $NO_x$ conversions of a conventional three-way catalyst.

SUMMARY OF THE INVENTION

The invention is a catalyst system for converting $NO_x$, CO, and HC contained in the exhaust gas from a gasoline-fueled engine operating under certain lean-burn conditions such that the ratio of $NO_x$ to HC ranges between ⅓ and 3/1, the system comprising: (a) a first stage catalyst consisting of a transition metal-containing zeolite (i.e., a copper ion-exchanged ZSM5 zeolite), and (b) a second stage three-way catalyst for treating the effluent of the said first stage catalyst. This comprises a high surface area alumina support impregnated with 0.5-20% lanthana, 0.2-30% palladium, and 0.1-20% titania.

The titania, lanthana, and palladium are discontinuous so that each may be exposed to the exhaust gas. The washcoat predominantly consists of gamma-$Al_2O_3$. Alpha-alumina, NiO, $CeO_2$, BaO, $La_2O_3$, and $TiO_2$ are present in smaller quantities. These oxides serve to increase the catalytic activity, durability, thermal stability, and adhesion of the washcoat. Titanium butoxide is applied as an outer coating and is particularly helpful in increasing the $NO_x$ conversion at redox ratios of 0.8-0.9.

Another aspect of this invention is a method of treating the exhaust gas from a gasoline-fueled engine that operates under controlled lean-burn conditions, the method comprising: (a) operating a gasoline-fueled engine under lean-burn conditions producing a hydrocarbon, particularly propylene, of at least 250 ppm; (b) exposing exhaust gas from such an engine to a first stage catalyst comprised of a copper ion-exchanged ZSM5 zeolite; and (c) exposing the effluent from the said first stage to a three-way second stage catalyst comprised of a high surface area alumina support impregnated with an intimate mixture of 0.5-20% lanthana, 0.2-30% palladium, and an outer washcoat of titanium butoxide.

The degree of conversion for the said method of treatment is at least 38-50% for $NO_x$ and about 100% for CO and HC.

DETAILED DESCRIPTION AND BEST MODE

Exhaust Content

The catalytic system of this invention operates to cleanse the exhaust gas generated by a fossil-fueled engine, particularly a gasoline-fueled internal combustion engine, operating under controlled lean-burn conditions. Lean-burn is generally used herein to mean: for a gasoline engine, redox ratio (R) between 0.03-0.9 (R being the ratio of reducing components to oxidizing components in the exhaust gas), or air/fuel (A/F) ratio between 15-23, or lambda between 1.02-1.7 (lambda being the ratio of actual A/F ratio to the stoichiometric A/F ratio for a given fuel); for a diesel engine, R between 0.03-0 9, A/F ratio between 15.4-30, and lambda between 1.1-2.0.

The catalyst system is designed to improve the conversion efficiency of the exhaust gas of a certain type of lean-burn engine, that is, a lean-burn engine that emits a ratio of $NO_x$/HC which is in the range of ⅓ to 3/1; this is achieved by suitable adjustment of engine design variables such as valve and spark timing and compression ratio and by employing strategies such as Exhaust Gas Recycle (EGR). The actual $NO_x$/HC ratio depends on the speed and load of the vehicle. The simple catalyst system of this invention is effective in converting the noxious elements of such exhaust gas at an economic cost.

This invention relies upon the naturally created hydrocarbons generated by lean-burn combustion. The hydrocarbons are used to convert the relatively low $NO_x$ emitted. Such hydrocarbon content will usually be in the range of 300-600 ppm, the principal components of which are slow-burning hydrocarbons (represented by propane) usually in the range of 100-200 ppm, and fast-burning hydrocarbons (represented by propylene) in the range of about 250-350 ppm. Propylene is the more effective hydrocarbon that acts as a reductant for $NO_x$ over the first stage catalyst of this invention, and therefore its minimum content plays a significant role with respect to this invention.

It is desirable that the $NO_x$ emissions from such a lean-burn engine be relatively low, in the range of 100-1000 ppm as a result of proper design of engine parameters. In addition, the amount of propylene present in the exhaust should exceed 250 ppm. This exhaust characterization, when combined with the catalyst elements of this invention, promote enhanced conversion efficiency at relatively economic cost.

FIRST STAGE CATALYST

Figure 1:
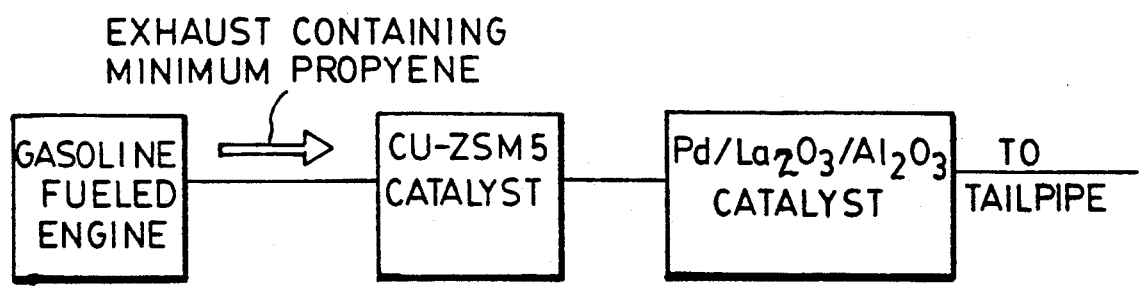
FIG. 1 is a block diagram for the catalyst system schematically illustrating in a preferred manner the essential elements of this invention.

The best mode of this invention is schematically illustrated in FIG. 1 and comprises a first stage copper ion-exchange ZSM5 zeolite catalyst. Generically speaking, the catalyst may contain a transition metal-containing zeolite, the zeolite being having a $SiO_2/Al_2O_3$ molar ratio greater than 10, preferably up to about 60 (see U.S. Pat. No. 4,297,328, which is expressly incorporated herein by reference for teaching use of other zeolites that may be used herein).

The transition metal, such as copper, is incorporated into the zeolite by ion-exchange. The transition metal may be selected from the group consisting of Cu, Co, Ni, Cr, Fe, Mn, Ag, Zn, Ca, and compatible mixtures thereof. Generally, a sodium, hydrogen, or ammonium zeolite is contacted with an aqueous solution of another cation, in this case an aqueous solution of soluble copper compound such as copper acetate, wherein replacement of the sodium, hydrogen, or ammonium ion by copper takes place. It is advantageous to provide as much transition metal ion in the zeolite as possible since the amount of transition metal present in the zeolite is directly related to the catalytic activity of the first stage. Preferably, this is at least 3% by weight of zeolite, up to a maximum determined by the $SiO_2/Al_{23}$ ratio. After replacing the sodium, hydrogen, or ammonium ion with the metal ion, the zeolite is generally washed to remove excess surface transition metal compound. It is not necessary to do so, however.

The first stage catalyst may also contain a transition metal oxide, such transition metal should be of the same type as that used in the ion exchange for the zeolite. Preferably, this transition metal is copper and copper is particularly preferred because it is active at lower temperatures. Preferably, the oxide is zirconia, although other oxides such as titania and silica, and very minor proportions of lanthana aluminate may be employed.

One method of making a copper-containing zirconia comprises soaking a quantity of zirconia, in the form of a fine powder, repeatedly, if desired, in a solution of copper compound. The resulting product is subsequently dried, then calcined at an elevated temperature between 300°-600° C., often at about 450° C. The copper compound should be one that is soluble or that can be dispersed in a liquid, that is, directly soluble in an aqueous solution or solubilized therein with the aid of an acid or base. Exemplary of such copper compounds are copper salts like copper nitrate and copper sulfate; organo-copper compounds like carboxylate of copper, copper acetate, and copper-cupric amines; organo-complexes of copper like diamine copper acetate; tetraamine copper sulfate, and copper acetylacetonate. Soluble compounds, exemplary of other transition metal compounds include cobalt acetate, nickel acetate, ferric chloride chromic nitrate, and manganese acetate.

When saturated zirconia is dried and calcined in air, the copper compound decomposes to form copper oxide. Copper is preferably present in an amount between 0.1-20% by weight of the copper-containing oxide. Each of the copper-containing oxide and the copper-containing zeolite may be ground to a fine powder, mixed together, and a slurry formed of them, and then applied to a substrate such as a metal or ceramic honeycomb. While it is preferable to make the catalyst in this way, it may be made by layering one material onto another.

The invention herein works best with a copper ion-exchanged ZSM5 zeolite. ZSM5 is a crystalline zeolite and is disclosed in U.S. Pat. No. 3,702,886, the disclosure of which is incorporated herein by reference. ZSM5 can have a $SiO_2/Al_2O_3$ ratio ranging from about 10-1000. The copper ion-exchanged version of such zeolite may be obtained by stirring a proportion of copper acetate solution, preferably about 0.05M, with the ZSM5 zeolite. The material is filtered, washed, and preferably ion-exchanged three times. It is then dried at about 120° C. for about three hours and calcined at about 600° C. for about three hours. The resulting material will contain copper-exchanged for an ion of the zeolite as well as copper impregnated onto the zeolite, i.e., about 3% copper by weight of zeolite. Typically, the copper ions will replace the sodium ions in the zeolite. The limit is set by the amount of $Al_2O_3$ in the zeolite. The copper-exchanged zeolite may contain copper in the weight percent range of 1-8% and will be stable up to a temperature of about 600° C. The zeolite catalyst is advantageously coated onto a foraminous support which is placed in the exhaust stream.

SECOND STAGE CATALYST

The second stage catalyst is a three-way catalyst for treating the effluent from the first stage by use of a high surface area alumina support impregnated with an intimate mixture of 0.5-20% lanthana, 0.2-30% palladium, and 0.1-8% titanium oxide. The second stage catalyst may also possess a stabilizing washcoat applied immediately to the support prior to the impregnation with palladium and lanthanum. Such stabilizing washcoat may contain nickel oxide, cerium oxide, barium oxide, lanthanum oxide, and titanium oxide, but controlled to amounts within the range of 0.01-10%.

The support must be a high surface area alumina, such as gamma alumina, rather than alpha forms of alumina because these latter forms have, among other factors, low surface area. With gamma alumina, the surface area will be significantly increased and be in the range of about 50-400 m²/g. The particle size of the gamma alumina should be less than 200 angstroms, and the monolithic carrier should have a cell size in the range of 100-600 cells per square inch. Gamma alumina may also be modified with oxides of base, rare earth, and alkali metal such as barium, cerium, titanium, and nickel, as mentioned earlier.

The lantha..a impregnation is carried out to load the support with lanthana in the weight range of 0.5-20% of the catalyst washcoat system. If lanthana is added in an amount less than such range, then the beneficial effect of increase in the activity due to lanthana is not observed. If lanthana exceeds such range, then the support surface area decreases and no additional benefit is derived. Lanthana should be impregnated in a manner to provide its discontinuous presence thereon; this may be achieved by using salts of lanthanum soluble in aqueous or organic media (such as lanthanum nitrate, lanthanum acetate) as a precursor. Elements that are equivalent to the function of lanthana for purposes of this invention may include tungsten oxide.

Palladium is impregnated in a manner to provide the presence of large crystalline particles, preferably in the particle size range of 5-1000 angstroms. With a palladium weight loading below 0.2%, there will be insufficient catalysis effect and therefore not promote the objects of this invention. If the palladium loading is in excess of 30%, the palladium surface area decreases and no additional benefit from palladium addition is derived.

When the redox ratio is in the range 0.8-0.9, it is very helpful to employ titanium oxide as an outer washcoat on the second stage catalyst because it significantly improves the $NO_x$ conversion efficiency in such a redox ratio range. At redox ratios less than 0.8, titanium oxide outer washcoat offers little improvement.

METHOD OF TREATING

The method aspect of this invention is one for treating the exhaust from a gasoline-fueled engine controlled to operate under lean-burn conditions while emitting gases in which the $NO_x$/hydrocarbon ratio is in the range of $\frac{1}{3}$ to 3/1. The method comprises: (a) operating such gasoline-fueled engines under lean conditions while producing hydrocarbons and $NO_x$ that are within the ratio ranges indicated; (b) exposing the exhaust from such an engine operated under such parameters to a copper ion-exchanged ZSM5 zeolite; and (c) thereafter exposing the effluent from said first stage catalyst to a three-way catalyst comprised of a high surface area alumina support impregnated with an intimate mixture of 0.5-20% lanthana and 0.2-30% palladium. This method of treatment is capable of achieving $NO_x$ conversion levels of 38-50% when the $NO_x$ content of the exhaust emanating from the engine is 400-1300 ppm, and conversion levels of 50-80% when the $NO_x$ content of the exhaust is lowered in the range 200-400 ppm by varying the engine design parameters.

PERFORMANCE

A pre-washcoated monolithic cordierite substrate was dipped in an aqueous solution of lanthanum nitrate to deposit 10% lanthanum by weight of the washcoat. The monolithic cordierite substrate contained alumina, nickel oxide, ceria, lanthana, and titania. The substrate was dried at 120° C. and calcined at 600° C. The substrate was then dipped in an aqueous solution of $PdCl_2$ containing 4% by volume $HNO_3$ to deposit 1% Pd by weight of the washcoat. The precursor was dried at 120° C. and calcined at 600° C. The precursor was later dipped in a solution of titanium butoxide (dissolved in an organic solvent such as butanol) to deposit.1 2% titanium by weight of the washcoat. The resulting material was dried at 120° C. and calcined at 600° C. to form the three-way catalyst for the second stage. For the first stage, a zeolite (ZSM5) material was contacted with an aqueous solution of copper nitrate (under controlled pH) to exchange 5% by weight of copper. The resulting material was dried at 120° C. 5% Cu-ZSM5 powder was suspended in an aqueous slurry and deposited on a monolithic cordierite substrate. The resulting material was dried and calcined at 400° C. to form the 5% Cu-ZSM5 catalyst.

Figure 2:
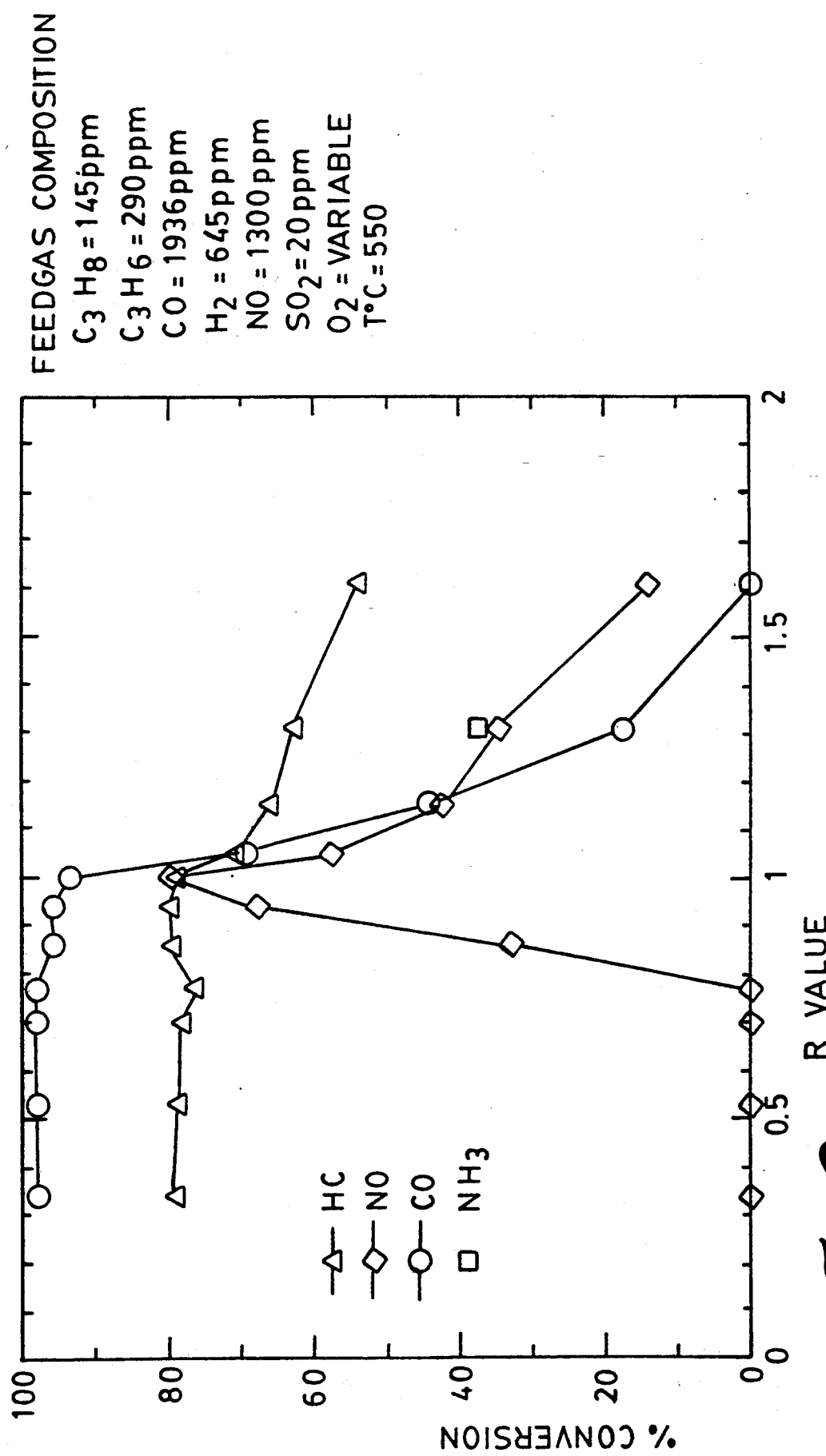
FIG. 2 is a graphical illustration of percent conversion efficiency as a function of R value for the second stage catalyst used by itself.

The second stage catalyst, only, was evaluated on a flow reactor. The feed gas used was as indicated in FIG. 2. The oxygen concentration was varied and nitrogen was used as the carrier gas. Propane and propylene were used to simulate, respectively, the slow and fast-burning hydrocarbons present in the typical engine exhaust gas of a lean-burn engine. A high $NO_x$ content (1300 ppm) was used to test the invented catalyst system under worst conditions. Such $NO_x$ values are typically observed under high speed conditions. When the oxygen concentration of the feed gas was about 4.0%, the feed gas resembled the engine out gas composition of a 1.9L lean-burn Escort engine. The performance results in FIG. 2 show that the nitric oxide conversion efficiency drops to 0% at redox ratios lower than 0.8. This second stage catalyst would have to be operated at least about the stoichiometric point for efficient removal of the three constituents and this is undesirable from a fuel economy standpoint. In addition, expensive electronic controls are required to maintain stoichiometric conditions.

Figure 3:
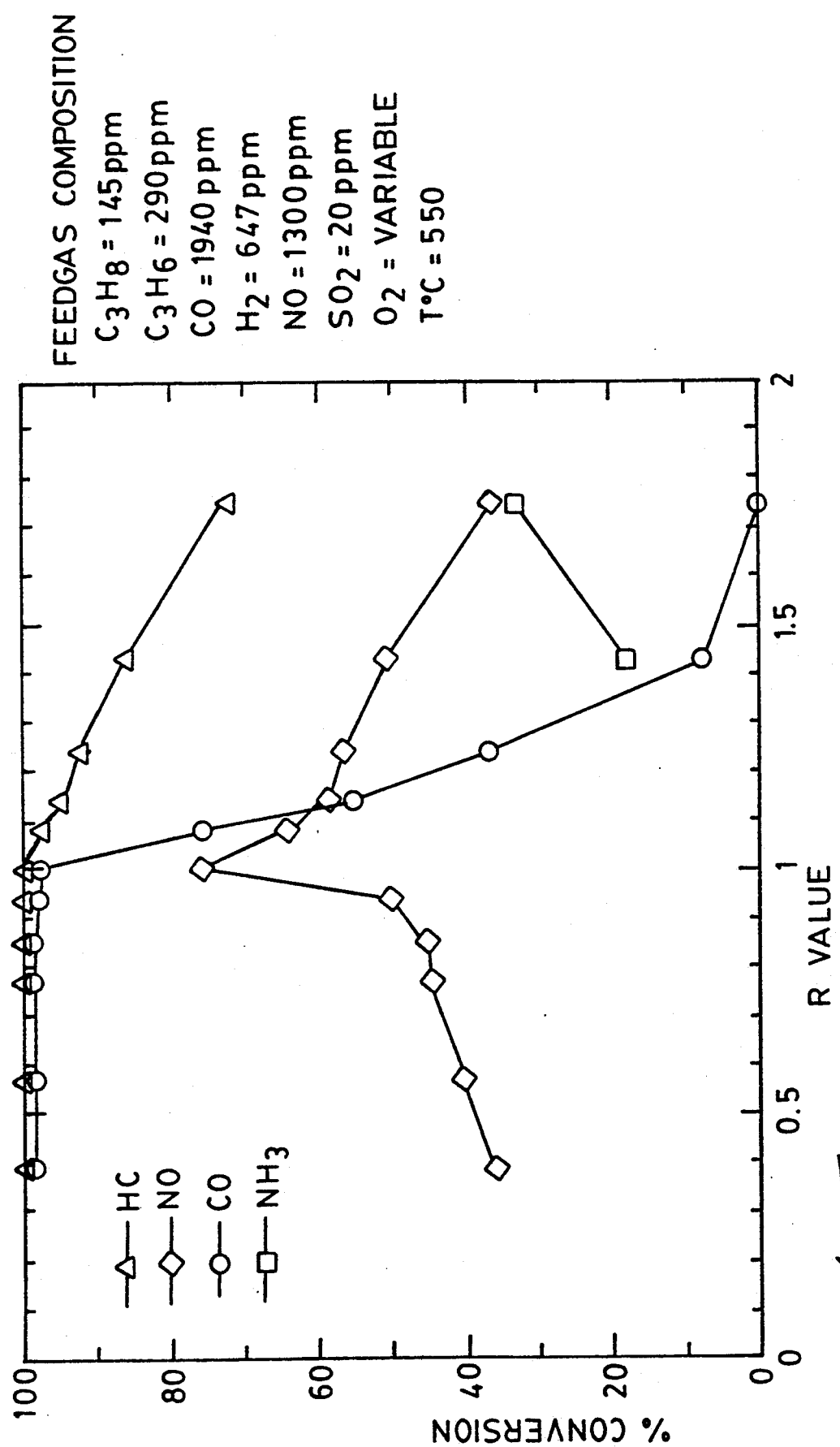
FIG. 3 is a graphical illustration of percent conversion efficiency as a function of R value showing the synergistic results that accrue from using both catalyst stages of this invention.
Figure 4:
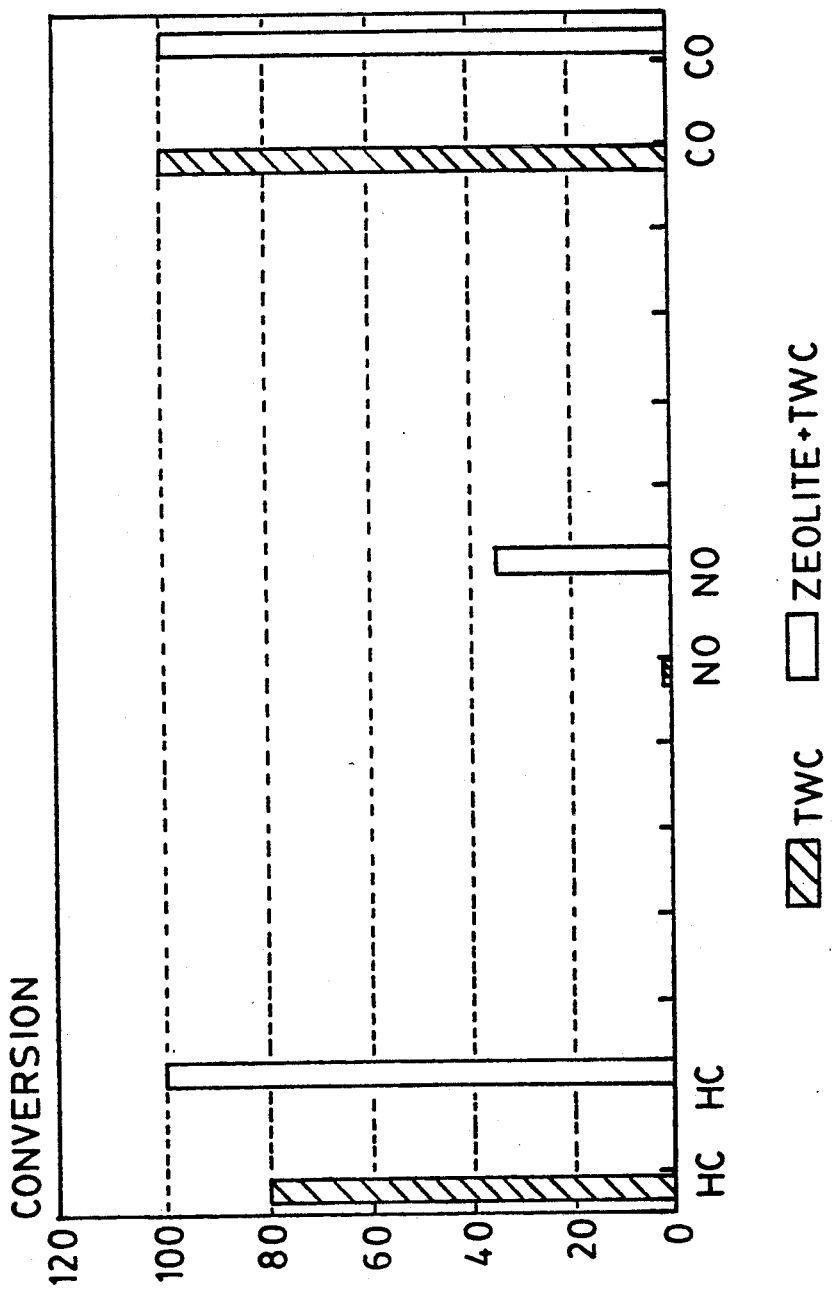
FIG. 4 is a graph comparing the conversion efficiencies for each of the principal exhaust ingredients when using the catalysts respectively deployed for generating the data of FIGS. 2 and 3.

FIG. 3 shows the results for the first and second stage catalyst used together in accordance with this invention; they are evaluated on a flow reactor using the feed gas composition as shown in FIG. 3. The space velocity for the specific flow reactor study of FIG. 3 was 20,000 $hr^{-1}$. Space velocity effects the conversion efficiency by changing the contact time between the catalyst and the gas. The nitric oxide and hydrocarbon conversion efficiency levels are significantly higher than those observed in FIG. 2 in the lean region. This may be explained by the fact that the first stage catalyst makes use of the natural inherent hydrocarbon content of the exhaust gas to reduce NO; $N_2$, $CO_2$, and $H_2O$ are obtained as by-products. The first stage catalyst additionally converts NO by direct decomposition of NO to $N_2$ and $O_2$. Thus, the effluent delivered to the entrance of the second stage catalyst contains relatively low amounts of $NO_x$. At the same time, the CO content is reduced as a result of the first stage so that the effluent introduced to the second stage has a CO content which is about 10-50% of that entering the first stage. With this preparatory modification of the exhaust gas by the first stage, the gases reaching the second stage are in a form that allows the three-way catalyst to perform at maximum efficiency and thereby achieve a synergistically enhanced net result. With less hydrocarbon to oxidize in the effluent, hydrocarbon conversion is improved by at least 20% over the entire R range; the nitrous oxide conversion efficiency in the lean region is improved by at least 33%.

We claim:

1. A catalyst system for converting $NO_x$, CO, and HC contained in the exhaust gas from a gasoline-fueled engine controlled to operate under lean-burn conditions such that the ratio of $NO_x$ to HC in the exhaust is in the range of $\frac{1}{3}$ to 3/1, the system comprising:
   (a) a first stage catalyst comprising a transition metal-containing zeolite for treating lean-burn exhaust gases; and
   (b) a three-way catalyst for treating, in series only, the efflu..t from said first stage catalyst comprising a high surface area alumina support impregnated with an intimate mixture of 0.5-20% lanthana and 0.2-30% palladium.

2. The catalyst system as in claim 1, in which said lanthana and palladium reside discontinuously on said support so that each may be exposed to the exhaust gas.

3. The catalyst system as in claim 1, in which said second stage catalyst additionally comprises an outer washcoat consisting of titanium oxide, said additional element being useful when exhaust has a redox ratio of 0.8–0.9 R.

4. The catalyst system as in claim 1, in which said second stage catalyst additionally comprises a stabilizing washcoat on said support selected from oxides of nickel, cerium, barium, lanthanum, and titanium.

5. The catalyst system as in claim 4, in which said stabilizing washcoat has a thickness in the range of 0.005–0.1 mm.

6. The catalyst system as in claim 1, in which said alumina is predominantly gamma alumina having a surface area in the range of 50–400 m$^2$/g.

7. The catalyst system as in claim 1, in which the exhaust gas content emitted by said engine has a NO$_x$ content in the range of 200–400 ppm, said lower NO$_x$ content being achieved by lowering exhaust temperature through use of suitable engine design variables such as compression ratio, spark timing, valve timing, and by employing strategies such as Exhaust Gas Recycle (EGR).

8. The catalyst system as in claim 1, in which the C$_3$H$_6$ content of said exhaust gas is at least 250 ppm.

9. The catalyst system as in claim 1, in which said C$_3$H$_6$ content of the exhaust is at least 250 ppm and the NO$_x$ content is in the range of 200–400 ppm.

* * * * *